United States Patent
Paschini et al.

(10) Patent No.: US 7,131,578 B2
(45) Date of Patent: Nov. 7, 2006

(54) SYSTEM AND METHOD FOR ELECTRONIC PREPAID ACCOUNT REPLENISHMENT

(75) Inventors: Miles Paschini, Rancho Santa Fe, CA (US); Marshall Rose, Sacramento, CA (US)

(73) Assignee: EWI Holdings, Inc., San Diego, CA (US)

( * ) Notice: Subject to any disclaimer, the term of this patent is extended or adjusted under 35 U.S.C. 154(b) by 0 days.

(21) Appl. No.: 10/848,529

(22) Filed: May 17, 2004

(65) Prior Publication Data

US 2005/0061872 A1    Mar. 24, 2005

Related U.S. Application Data

(60) Provisional application No. 60/473,685, filed on May 28, 2003.

(51) Int. Cl.
*G06F 17/60* (2006.01)

(52) U.S. Cl. ............. 235/379; 235/381; 235/380; 705/66; 705/61

(58) Field of Classification Search ............ 235/379, 235/380, 381, 375; 705/16–17, 66, 64, 75, 705/39, 61
See application file for complete search history.

(56) References Cited

U.S. PATENT DOCUMENTS

| | | |
|---|---|---|
| 4,359,631 A | 11/1982 | Lockwood et al. |
| 4,567,359 A | 1/1986 | Lockwood |
| RE32,115 E | 4/1986 | Lockwood et al. |
| 5,309,355 A | 5/1994 | Lockwood |
| 5,576,951 A | 11/1996 | Lockwood |
| 5,577,109 A | 11/1996 | Stimson et al. |
| 5,578,808 A | 11/1996 | Taylor |
| 5,621,787 A | 4/1997 | McKow et al. |
| 5,696,908 A | 12/1997 | Muehlberger et al. |
| 5,722,067 A | 2/1998 | Fougnies et al. |

(Continued)

FOREIGN PATENT DOCUMENTS

JP    2003-16368 A   *   6/2001

OTHER PUBLICATIONS

Notification of Transmittal of the International Search Report and the Written Opinion of the International Search Authority, or the Declaration, PCT/US04/15658, Mailed Jun. 22, 2005.

(Continued)

*Primary Examiner*—Thien M. Le
*Assistant Examiner*—Edwyn Labaze
(74) *Attorney, Agent, or Firm*—Cooley Godward Kronish

(57) ABSTRACT

A method for crediting a customer account maintained by a vendor of services in response to payment received from a customer is disclosed herein. The method includes issuing, to the customer, a membership account number associated with at least the customer account. A membership account number and a payment corresponding to a requested amount of a service offered by the vendor are received from the customer at a point-of-sale. The method further includes generating, at the point-of-sale, an authorization message including at least the membership account number and embedded transaction information identifying the service offered by the vendor and the requested amount. The embedded transaction information is then communicated from the point-of-sale to a database server. The customer account is credited, in response to the embedded transaction information, based upon an amount of the payment. The method also includes electronically transferring funds based upon the amount of the payment from a first account associated with the point-of-sale to a second account associated with the vendor.

55 Claims, 8 Drawing Sheets

U.S. PATENT DOCUMENTS

| | | | |
|---|---|---|---|
| 5,778,313 | A | 7/1998 | Fougnies |
| 5,828,740 | A | 10/1998 | Khuc et al. |
| 5,845,259 | A | 12/1998 | West et al. |
| 5,854,975 | A | 12/1998 | Fougnies et al. |
| 5,868,236 | A | 2/1999 | Rademacher |
| 5,884,292 | A | 3/1999 | Baker et al. |
| 5,903,633 | A | 5/1999 | Lorsch |
| 5,945,653 | A * | 8/1999 | Walker et al. ............. 235/380 |
| 5,991,380 | A | 11/1999 | Bruno et al. |
| 5,991,381 | A | 11/1999 | Bouanaka et al. |
| 5,991,749 | A | 11/1999 | Morrill, Jr. |
| 6,035,025 | A | 3/2000 | Hanson |
| 6,064,990 | A * | 5/2000 | Goldsmith .................. 705/75 |
| 6,081,791 | A | 6/2000 | Clark |
| 6,157,823 | A | 12/2000 | Fougnies et al. |
| 6,169,975 | B1 | 1/2001 | White et al. |
| 6,185,545 | B1 | 2/2001 | Resnick et al. |
| 6,188,752 | B1 | 2/2001 | Lesley |
| 6,289,319 | B1 | 9/2001 | Lockwood |
| 6,628,766 | B1 | 9/2003 | Hollis et al. |
| 6,651,885 | B1 | 11/2003 | Arias |
| 6,827,260 | B1 * | 12/2004 | Stoutenburg et al. ....... 235/380 |
| 6,941,285 | B1 * | 9/2005 | Sarcanin ...................... 705/67 |
| 2001/0001321 | A1 * | 5/2001 | Resnick et al. ............... 705/17 |
| 2002/0152124 | A1 * | 10/2002 | Guzman et al. .............. 705/16 |
| 2002/0156696 | A1 * | 10/2002 | Teicher ........................ 705/26 |
| 2002/0188510 | A1 | 12/2002 | Arias |
| 2003/0126064 | A1 * | 7/2003 | Foran et al. .................. 705/37 |
| 2003/0126075 | A1 * | 7/2003 | Mascavage et al. .......... 705/39 |
| 2005/0087595 | A1 * | 4/2005 | Phillips et al. .............. 235/379 |
| 2006/0074799 | A1 * | 4/2006 | Averyt et al. ................. 705/40 |

OTHER PUBLICATIONS

Business Wire, Inc., FOCUS, Business Editors, "The Winner's Edge.com Announces Purchase Agreement," Nov. 1, 1999, pp. 5-6.

Business Wire, Inc., FOCUS, Business Editors, "Easy Wireless Unveils its Revolutionary Pre-Paid PIN Dispensing Kiosk; Wireless 2000," Feb. 28, 2000, p. 3.

www.carkleen.co.nz/Products/Codax "Codax Activation System" Car Kleen—Leaders in Vehicle Wash Technology.

Qcomm International, Inc. Website—Qxpress Prepaid Services Point-of-Sale Activatiom (2000).

Knowles, Francine, "ATMs to Dispense Calling Cards; Ameritech, Cash Station in Venture," *Abstract*, Financial Section, Chicago Sun-Times, Oct. 18, 1995, ref. 1, Ameritech & ATM, PINs, or Prepaid Cards. 1994-1997. Lexis/Nexis Database.

Ameritech Corp., "Ameritech debuts its prepaid cellular," *Abstract*, RCR Radio Communications Report 15, No. 31 (1996), ref. 7, Ameritech & ATM, PINs, or Prepaid Cards. 1994-1997, Lexis/Nexis Database.

Ameritech Corp., et al., "Phone cards meet ATMs," *Abstract*, Bank Technology News 8, No. 12 (1995), ref. 8, Ameritech & ATM, PINs, or Prepaid Cards. 1994-1997, Lexis/Nexis Database.

Ameritech Corp., et al., "Ameritech in Prepaid Card Venture," *Abstract*, American Banker CLX, No. 205 (1995), ref. 9, Ameritech & ATM, PINs, or Prepaid Cards. 1994-1997, Lexis/Nexis Database.

\* cited by examiner

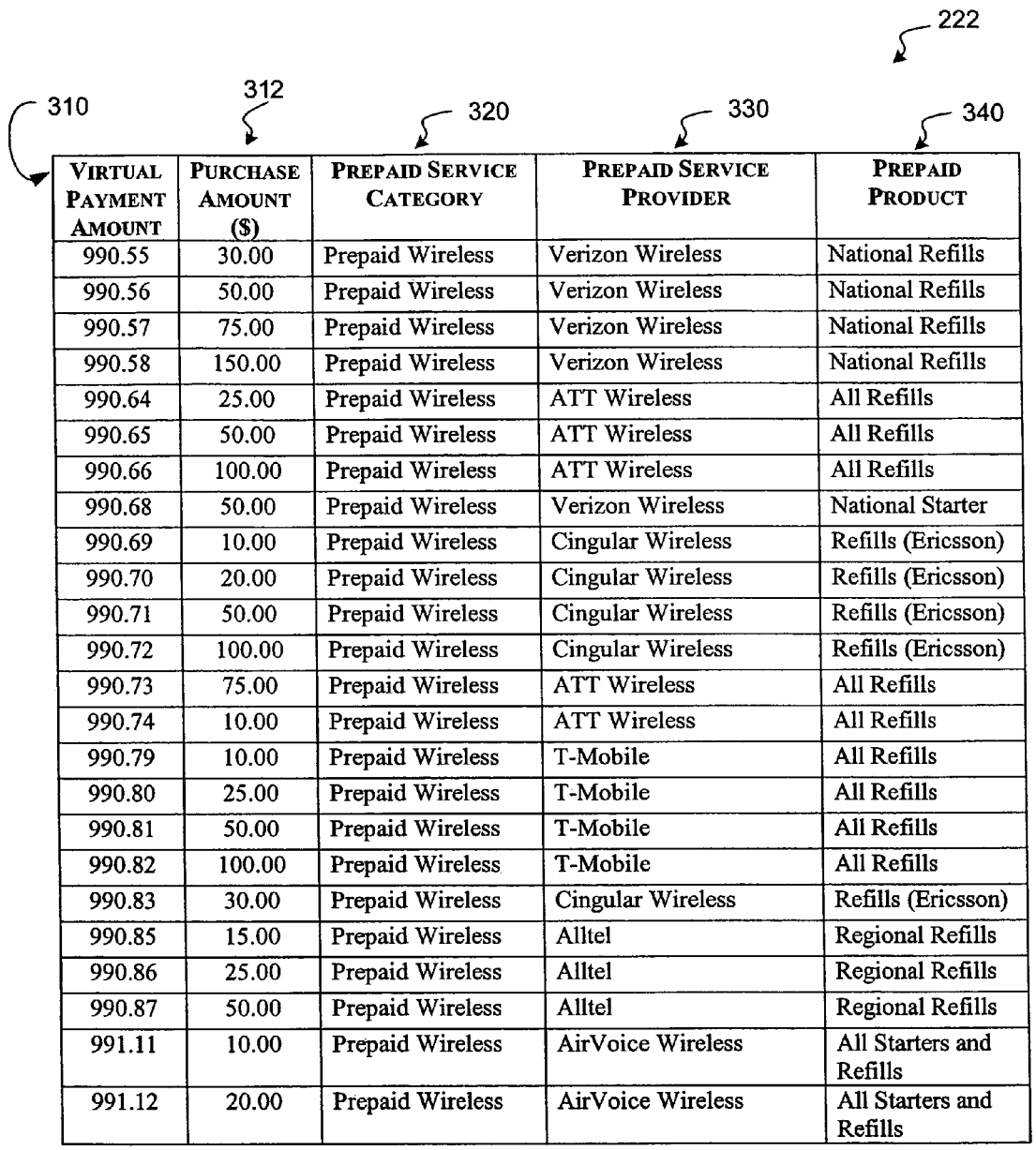

| Virtual Payment Amount | Purchase Amount ($) | Prepaid Service Category | Prepaid Service Provider | Prepaid Product |
|---|---|---|---|---|
| 990.55 | 30.00 | Prepaid Wireless | Verizon Wireless | National Refills |
| 990.56 | 50.00 | Prepaid Wireless | Verizon Wireless | National Refills |
| 990.57 | 75.00 | Prepaid Wireless | Verizon Wireless | National Refills |
| 990.58 | 150.00 | Prepaid Wireless | Verizon Wireless | National Refills |
| 990.64 | 25.00 | Prepaid Wireless | ATT Wireless | All Refills |
| 990.65 | 50.00 | Prepaid Wireless | ATT Wireless | All Refills |
| 990.66 | 100.00 | Prepaid Wireless | ATT Wireless | All Refills |
| 990.68 | 50.00 | Prepaid Wireless | Verizon Wireless | National Starter |
| 990.69 | 10.00 | Prepaid Wireless | Cingular Wireless | Refills (Ericsson) |
| 990.70 | 20.00 | Prepaid Wireless | Cingular Wireless | Refills (Ericsson) |
| 990.71 | 50.00 | Prepaid Wireless | Cingular Wireless | Refills (Ericsson) |
| 990.72 | 100.00 | Prepaid Wireless | Cingular Wireless | Refills (Ericsson) |
| 990.73 | 75.00 | Prepaid Wireless | ATT Wireless | All Refills |
| 990.74 | 10.00 | Prepaid Wireless | ATT Wireless | All Refills |
| 990.79 | 10.00 | Prepaid Wireless | T-Mobile | All Refills |
| 990.80 | 25.00 | Prepaid Wireless | T-Mobile | All Refills |
| 990.81 | 50.00 | Prepaid Wireless | T-Mobile | All Refills |
| 990.82 | 100.00 | Prepaid Wireless | T-Mobile | All Refills |
| 990.83 | 30.00 | Prepaid Wireless | Cingular Wireless | Refills (Ericsson) |
| 990.85 | 15.00 | Prepaid Wireless | Alltel | Regional Refills |
| 990.86 | 25.00 | Prepaid Wireless | Alltel | Regional Refills |
| 990.87 | 50.00 | Prepaid Wireless | Alltel | Regional Refills |
| 991.11 | 10.00 | Prepaid Wireless | AirVoice Wireless | All Starters and Refills |
| 991.12 | 20.00 | Prepaid Wireless | AirVoice Wireless | All Starters and Refills |

FIG. 3A

| Virtual Payment Amount | Purchase Amount ($) | Prepaid Service Category | Prepaid Service Provider | Prepaid Product |
|---|---|---|---|---|
| 991.13 | 30.00 | Prepaid Wireless | AirVoice Wireless | All Starters and Refills |
| 991.14 | 50.00 | Prepaid Wireless | AirVoice Wireless | All Starters and Refills |
| 991.15 | 100.00 | Prepaid Wireless | AirVoice Wireless | All Starters and Refills |
| 991.28 | 5.00 | Prepaid Long Distance | Sprint | Dollar Value |
| 991.29 | 10.00 | Prepaid Long Distance | Sprint | Dollar Value |
| 991.30 | 20.00 | Prepaid Long Distance | Sprint | Dollar Value |
| 991.31 | 5.00 | Prepaid Long Distance | Radiant Telecom | Clear Connect |
| 991.32 | 10.00 | Prepaid Long Distance | Radiant Telecom | Clear Connect |
| 991.33 | 20.00 | Prepaid Long Distance | Radiant Telecom | Clear Connect |
| 991.34 | 5.00 | Prepaid Long Distance | Radiant Telecom | Penny A Minute |
| 991.35 | 10.00 | Prepaid Long Distance | Radiant Telecom | Penny A Minute |
| 991.36 | 20.00 | Prepaid Long Distance | Radiant Telecom | Penny A Minute |
| 991.37 | 5.00 | Prepaid Long Distance | Radiant Telecom | MexiMundo |
| 991.38 | 10.00 | Prepaid Long Distance | Radiant Telecom | MexiMundo |
| 991.39 | 20.00 | Prepaid Long Distance | Radiant Telecom | MexiMundo |
| 991.40 | 10.00 | Prepaid Long Distance | Sprint | Connect Fee |
| 991.41 | 20.00 | Prepaid Long Distance | Sprint | Connect Fee |
| 991.64 | 39.00 | Prepaid Local Dial Tone | Reconex | Regional Starter |
| 991.65 | 52.99 | Prepaid Local Dial Tone | Reconex | Regional Refill |
| 991.67 | 5.00 | Prepaid Local Dial Tone | Reconex | Optional Services |
| 991.68 | 10.00 | Prepaid Local Dial Tone | Reconex | Optional Services |
| 991.69 | 17.99 | Prepaid Wireless | Tracfone | National Refill |
| 991.70 | 24.99 | Prepaid Wireless | Tracfone | National Refill |
| 991.71 | 39.99 | Prepaid Wireless | Tracfone | National Refill |
| 991.72 | 74.99 | Prepaid Wireless | Tracfone | National Refill |

FIG. 3B

SYSTEM AND METHOD FOR ELECTRONIC PREPAID ACCOUNT REPLENISHMENT

CROSS-REFERENCE TO RELATED APPLICATIONS

This application claims priority under 35 U.S.C. §119(e) to U.S. provisional application Ser. No. 60/473,685, entitled SYSTEM AND METHOD FOR ELECTRONIC PREPAID ACCOUNT REPLENISHMENT, filed May 28, 2003.

FIELD OF THE INVENTION

The present invention relates generally to methods and apparatus for effecting payment for goods and services. More particularly, the present invention is directed to a system and method for electronically crediting or otherwise replenishing an account for prepaid services in substantially real-time following receipt of a payment at a point-of-sale or other convenient location.

BACKGROUND OF THE INVENTION

There currently exist "pre-paid" telephone cards that allow a customer to purchase a desired amount of long-distance telephone time from a particular telephone service provider. These pre-paid telephone cards are often sold by dealers such as convenience stores or wireless phone stores. Pre-paid telephone cards are also often sold in airports. Vending machines for selling pre-paid telephone cards also have been developed. Each of these pre-paid telephone cards has a specific monetary denomination. For example, a customer could purchase a $10 card, a $20 card, or a $100 card. These pre-paid telephone cards are sold by particular telephone service providers such as AT&T, MCI, Sprint, etc. A customer could, for example, buy a $20 MCI card, which would entitle him or her to $20 worth of long-distance calling service provided by MCI. These cards are referred to as "pre-paid" because the customer purchases the long-distance time before he or she actually places the call. This is in contrast to the more typical post-pay service that most telephone customers use with the telephone in their residence or office. With post-pay service, customers are sent a bill on a periodic basis. The customer pays for calls that have already been made, rather than calls that will be made in the future.

Frequently, the pre-paid telephone cards that are sold by dealers or vending machines are of the "scratch-off" type. After the customer purchases a card, he or she can scratch off a layer of material which reveals a personal identification number (PIN). The layer of scratch-off material hides the PIN from customers browsing in the store who have not purchased the card. After a customer purchases a card and scratches off the layer of material, the customer can then use the card to place a long-distance call. When the customer wishes to place a long-distance call, he or she dials a special number provided by the telephone service provider. The customer then enters the PIN written on the card. The long distance provider automatically debits the charge of the call from an account associated with the PIN.

As an example, a customer could purchase a $10 MCI card. After the customer rubs off the layer of material, a PIN number 129384348764 is revealed. When the customer wishes to place a long-distance call, the customer dials an MCI access number. The customer then enters PIN 129384348764. The long-distance carrier, MCI, identifies the PIN and recognizes that there is $10 worth of credit in this account. If the customer places a call which lasts 5 minutes and costs 4$, MCI will debit the account so that $6 remains. The next time the customer places a call using that PIN number, the system will find that $6 remains in the account associated with that PIN.

One problem with these pre-paid phone cards is that the cards present a major inventory headache for dealers. There is a lot of work and expense associated with maintaining a filled inventory of cards. First, the dealer or vending machine operator has to predict which cards will be in demand and determine how many cards of each denomination to order for each of various providers. The dealer then has to pay for the desired inventory of cards up front, which requires a significant cash outlay. The dealer then has to keep track of how many cards are left in stock for each service provider and of each different monetary denomination, and determine when to order a new batch of cards. All of these costs associated with filled inventory can be time consuming and expensive for dealers.

Another problem is that these pre-paid telephone cards are especially vulnerable to theft, loss, and other inventory "shrinkage." Because the cards are small, it is easy for a shoplifter to pocket a card unnoticed. Since these cards have a high value to them and are so easy to pocket, dealers which sell these cards are extremely vulnerable to inventory shrinkage.

Vending card machines have been proposed which store personal identification numbers (PINs) in a memory in the machine. A customer can then purchase a pre-paid telephone PIN by inserting cash into the machine. Once the cash has been inserted, a PIN and usage instructions stored within the machine memory are printed upon a blank card that is dispensed to the customer. The machine can replenish its stock of PINs when the memory runs out of PINs or on a periodic basis by accessing a remote store of PINs via a modem.

The problem with these vending machines is that there are still significant costs associated with inventorying the PINs. The PINs are retained in a memory in the machine which has a similar effect to storing cards. Once a PIN has been stored in the memory of a particular machine, that PIN becomes unavailable to be used by any other dealer, even if the PIN is never purchased. Additionally, if the machine were to break, or the memory were to be erased, there is a problem determining who is responsible for paying for the PINs that were contained in the memory. Additionally, decisions must still be made how many PINs to store in memory, what monetary denominations to store in memory, and for which providers to store PINs in memory. Therefore, there are still significant inventory costs associated with storing the PINs in the vending machine. Additionally, these proposed vending machines do not provide consumers the ability to obtain a PIN from the convenience of their homes or offices.

Another system which has been proposed is a web site which is accessed over the Internet. A customer can go to this web site and purchase pre-paid telephone service. A PIN is then e-mailed to the customer's e-mail address. The problem with this service is that a customer must be able to access his or her email account in order to obtain the PIN. Additionally, e-mail is often insecure. If a computer hacker is "listening in" on an individual's email, then the hacker can steal the PIN and use it for his own purposes. Additionally, if a customer is purchasing a PIN in a convenience store or an airport, the customer will probably not have access to his or her e-mail account. The customer may have to wait to return to his or her home or office to access the PIN. Additionally, e-mail can sometimes be slow and it may take hours or days to retrieve the message from the customers Internet Service Provider (ISP).

A system addressing these shortcomings is described in U.S. Pat. No. 6,526,130 (the "'130 patent"), which is assigned to the assignee of the present invention. The '130 patent describes a secure system capable of providing PINs for pre-paid goods and services conveniently to customers. The system of the '130 patent advantageously relieves dealers such as convenience stores and vending machine operators from the costs associated with maintaining a filled inventory of pre-paid cards and PINs. In addition, the system allows consumers to select from a wide-range of providers and monetary denominations without requiring the dealer to maintain a large filled inventory of cards or predict which type of cards or PINs to order. Specifically, after a customer purchases a pre-paid amount of a good or service, the customer receives a personal identification number (PIN) capable of being downloaded in real-time over a network such as the Internet. After the customer receives the PIN, the customer can then use this PIN at any convenient time to access the desired good or service.

Although the system of the '130 patent provides a convenient mechanism for establishing a pre-paid account, it would also be desirable to conveniently be able to "recharge" or otherwise replenish an account for pre-paid services prior to or upon exhaustion of the initial allocation of services. For example, considering again the case in which $10 of pre-paid long distance service has been purchased from a telecommunications carrier, it is usually possible to replenish this type of account by calling an 800 number and providing a credit card number to a service representative or automated system. However, this approach tends to be burdensome to the customer and requires expenditures on the part of the telecommunications carrier. Perhaps more significantly, many users of pre-paid telecommunications services accounts have experienced credit difficulties and thus may not have a valid credit card available for such replenishment purposes.

At least one pre-paid account replenishment scheme has been proposed which utilizes the existing financial network for credit card transactions, but which does not require the account holder to actually possess a valid credit card. That is, the account holder is provided the opportunity to make payments in the form of cash or the equivalent at a merchant point-of-sale. These payments are then posted to an intermediary account, from which payment may subsequently be made on behalf of the account holder to the applicable pre-paid services vendor. Unfortunately, this approach disadvantageously requires the establishment of an "intermediary" account for the account holder distinct from the account maintained with the pre-paid services vendor. Moreover, this approach does not contemplate the establishment of a single account through which pre-paid accounts with multiple vendors of pre-paid services could be conveniently replenished.

SUMMARY OF THE INVENTION

In summary, the present invention relates to a method for crediting a customer account maintained by a vendor of services in response to payment received from a customer. The method includes issuing, to the customer, a membership account number associated with at least the customer account. A membership account number and a payment corresponding to a requested amount of a service offered by the vendor are received from the customer at a point-of-sale. The method further includes generating, at the point-of-sale, an authorization message including at least the membership account number and embedded transaction information identifying the service offered by the vendor and the requested amount. The embedded transaction information is then communicated from the point-of-sale to a database server. In response to the embedded transaction information, the customer account is credited based upon an amount of the payment. The method also includes electronically transferring funds based upon the amount of the payment from a first account associated with the point-of-sale to a second account associated with the vendor.

The present invention is also directed to a method for crediting a customer account maintained by a vendor of prepaid services in response to payment received from a customer. The method includes issuing, to the customer, a membership card containing a membership account number. The membership account number and a payment corresponding to a requested amount of a prepaid service offered by the vendor are then received from the customer at a point-of-sale. The method further includes maintaining, within a database server, a database associating the membership account number with identifying information pertaining to the customer account. An association between a merchant account number applicable to the point-of-sale and a list of approved prepaid services authorized to be purchased at the point-of-sale is also maintained within the database. At the point-of-sale, an authorization message including at least the membership account number and embedded transaction information identifying the prepaid service offered by the vendor and the requested amount is generated. The method also includes maintaining, within the database, an association between virtual payment amounts and monetary amounts of prepaid services offered by a plurality of vendors, the embedded transaction information including a first of the virtual payment amounts. The embedded transaction information is then communicated from the point-of-sale to the database server. Subsequent to receipt of the embedded transaction information at the database server, the customer account is credited based upon an amount of the payment. The method further includes electronically transferring funds based upon the amount of the payment from a first account associated with the point-of-sale to a second account associated with the vendor.

In another aspect, the present invention relates to a method for crediting a customer account maintained by a vendor of services in response to payment received from a customer at a point-of-sale. The method includes receiving, at a database server, an authorization message including at least a membership account number associated with the customer account, embedded transaction information identifying an offered service, and a requested amount corresponding to the payment. The method further includes crediting, in response to the embedded transaction information, the customer account based upon an amount of the payment. Funds are then electronically transferred, from a first account associated with the point-of-sale to a second account associated with the vendor, based upon the amount of the payment.

In yet another aspect the present invention is directed to a method for providing authorization to credit a customer account maintained by a vendor of services in response to payment received from a customer. The method includes receiving, from the customer at a point-of-sale, a membership account number associated with at least the customer account and a payment corresponding to a requested amount of a service offered by the vendor. The method further includes generating, at the point-of-sale, an authorization message including at least the membership account number and embedded transaction information identifying the service offered by the vendor and the requested amount. The embedded transaction information, which is capable of being used to facilitate crediting of the customer account based upon an amount of the payment, is then transmitted from the point-of-sale to a database server.

BRIEF DESCRIPTION OF THE DRAWINGS

For a better understanding of the nature of the features of the invention, reference should be made to the following detailed description taken in conjunction with the accompanying drawings, in which:

FIG. 3 illustratively represents the organization of a virtual payment identifier database disposed within the prepaid transaction processor of FIG. 2.

DETAILED DESCRIPTION OF THE INVENTION

Figure 1:
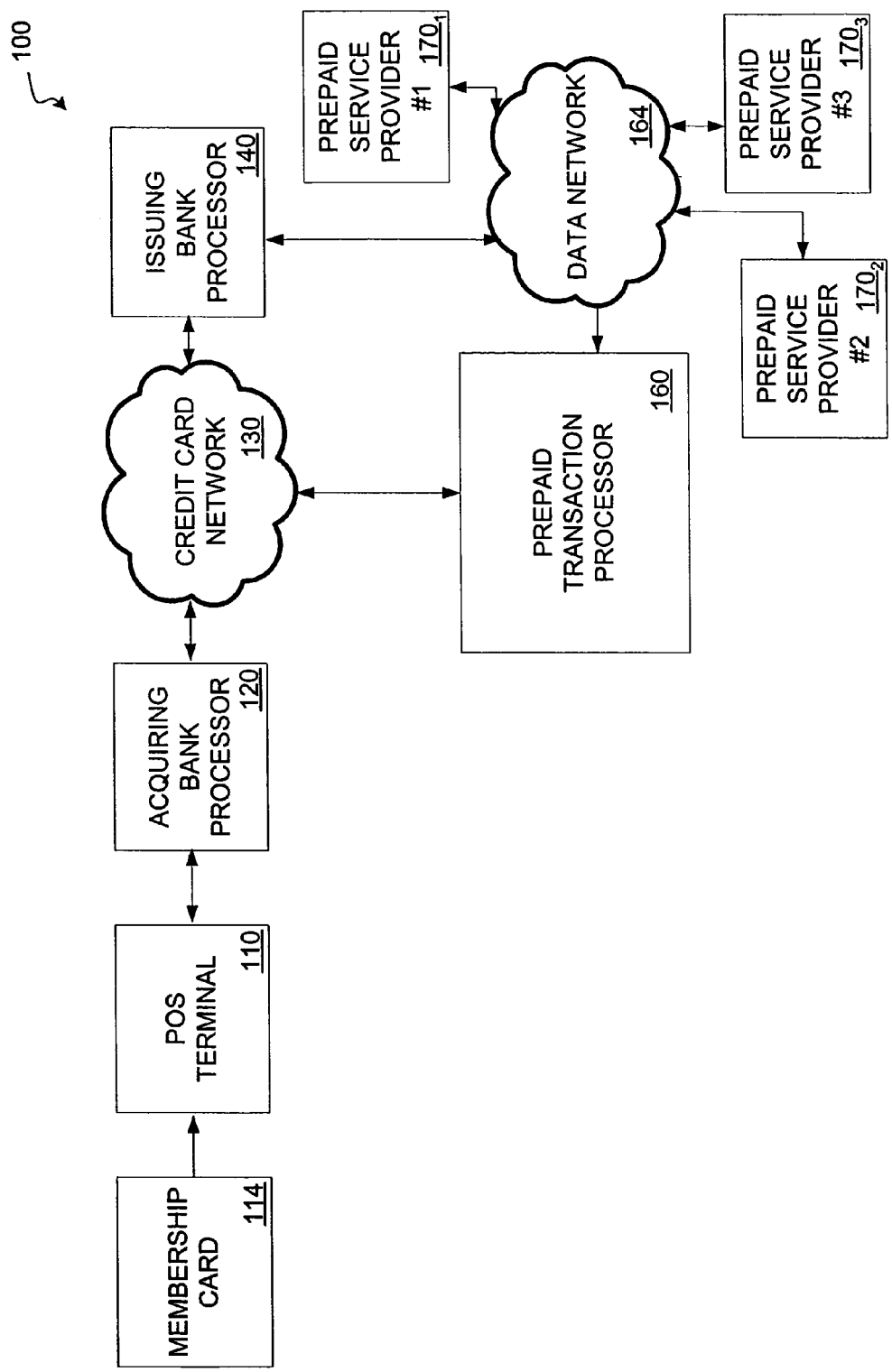
FIG. 1 provides a simplified illustrative representation of a system for electronic prepaid account replenishment in accordance with the present invention.

FIG. 1 provides a simplified illustrative representation of the system for electronic prepaid account replenishment 100 of the present invention. As is described herein, the present invention allows a customer to replenish a prepaid account relating to any good or service, such as telephone service, gasoline, electricity, dry-cleaning, bus service, subway service, magazines, newspapers, or bundled goods and services. The system 100 includes a merchant point-of-sale (POS) terminal 110 configured to read information incorporated within membership cards issued to customers by an issuing bank or similar financial institution. Each membership card 114 may be an actual credit card, a debit card, a stored value (prepaid credit) card, or other machine-readable card capable of storing a membership account number.

When a customer desires to replenish the value of one or more prepaid accounts associated with the membership card 114, the customer presents the card 114 to the merchant operating the POS terminal 110 and specifies a particular prepaid service (e.g., prepaid wireless services from Cingular Wireless) and the amount by which the customer's account for such service is to be replenished (e.g., $20). Using the membership card 114, and the prepaid service and value information provided by the customer, the merchant uses the POS terminal 110 to create an account replenishment transaction message. Specifically, the merchant "swipes" the membership card 114 through the POS terminal 110, which reads the membership account number from the membership card 114. The merchant also enters a "virtual" payment amount into the terminal 110 corresponding to the specified prepaid account and replenishment value. This results in generation of the account replenishment transaction message, which appears to a card association network 130 (e.g., VisaNet) as a standard credit card authorization transaction. This message contains embedded transaction information (i.e., membership account number, virtual payment amount, and merchant account number associated with the merchant operating the POS terminal 110) which enables the applicable prepaid service account associated with the membership card 114 to be credited in the manner described below. In typical implementations the account replenishment transaction message is relayed by an acquiring bank processor 120 to the card association network 130, within which it is routed to an issuing bank processor 140 operated by the bank or institution responsible for issuing the customer's membership card 114.

The issuing bank processor 140 examines the virtual payment amount within the account replenishment transaction message and determines that such transaction does not in fact correspond to a standard credit card authorization transaction. In the exemplary embodiment the issuing bank processor 140 is configured to distinguish between virtual payment amounts and amounts associated with standard credit card authorization transactions. For example, in cases in which the membership card 114 functions as a stored value card, a limit on the amount of funds permitted to be stored in the account (e.g., $500) could be established. In this case if all virtual payment amounts are within a range which exceeds this funds limit (e.g., $9xx.00), then such virtual payment amounts will always be distinguishable from the payment amounts associated with conventional transactions involving the stored value card.

Referring again to FIG. 1, the issuing bank processor 140 forwards the embedded transaction information within the account replenishment transaction message to a prepaid transaction processor 160 via a data network 164 (e.g., the Internet). Within the transaction processor 160, customer information specific to the service provider 170 with which the customer's prepaid account is maintained is retrieved from a customer account database 216 (FIG. 2), which is indexed as a function of membership account number. For example, in the case in which the customer's account to be replenished is for prepaid wireless services, the phone number associated with such account could be retrieved from the database 216. As is discussed below, in alternate implementations the account replenishment transaction message may be routed by the card association network 130 directly to the transaction processor 160; that is, the transaction processor 160 may alternately be directly connected to the card association network 130, thereby enabling the account replenishment transaction message to bypass the issuing bank processor 140.

The prepaid transaction processor 160 automatically contacts a server operated by the appropriate service provider 170 and requests it to credit the customer's prepaid account by an amount encoded by the virtual payment amount within the embedded transaction information. After submitting this request to the service provider 170 via the data network 164, the prepaid transaction processor 160 awaits a response as to the outcome of the request. If the request is accepted by the service provider 170, the success of the request may be communicated to the customer other than via the card association network 130. For example, if the customer is a user of wireless services, an SMS message or the equivalent confirming the success of the replenishment transaction may be sent to the customer's wireless communication device. In addition, in the event the replenishment transaction is successfully completed, the transaction processor 160 sends a predefined response over the card association network 130 for display on the screen of the POS terminal 110. The merchant will then typically inform the customer the replenishment transaction has been successfully completed. If for some reason the replenishment transaction is not completed, the transaction processor 160 sends a different predefined response over the card association network 130 for display on the screen of the POS terminal 110.

The type of predefined response communicated over the card association network 130 in response to successful completion or failure of the replenishment transaction will generally be dependent upon whether final settlement of a successfully completed transaction (i.e., transfer of funds from a bank account of the merchant operating the POS terminal 110 to a bank account of the service provider 170) is effected using the card association network 130 or by some other means. For example, if such final settlement is not to be carried out using the card association network 130, it will generally be desired to send a "decline" response over the card association network 130 to the POS terminal 110 in the event the replenishment transaction is successfully completed (i.e., the service provider 170 credits the customer's account by the requested amount). As a consequence, funds will not be transferred due to successful completion of the account replenishment transaction via a settlement operation of the type generally performed upon successful consummation of a transaction using the card association network 130. In this case a "processing error" response or the equivalent is communicated via the card association network 130 to the POS terminal if for some reason the account replenishment transaction is not successfully completed. On the other hand, if final settlement between the merchant operating the POS terminal 110 and the service provider 170 in connection with successful completion of the account replenishment transaction is to be performed via the card association network 130, then the card association network 130 may opt to permit the POS terminal to generate a specialized "fulfillment" transaction. In contrast to the account replenishment transaction message described above, such a fulfillment transaction would not be processed by the card association network 130 as a standard credit card authorization transaction. Specifically, approval of this type of fulfillment transaction would constitute authorization to transfer funds from the bank account associated with the acquiring processor bank processor 120 to the account associated with the issuing bank processor 140, rather than vice-versa.

Figure 2:
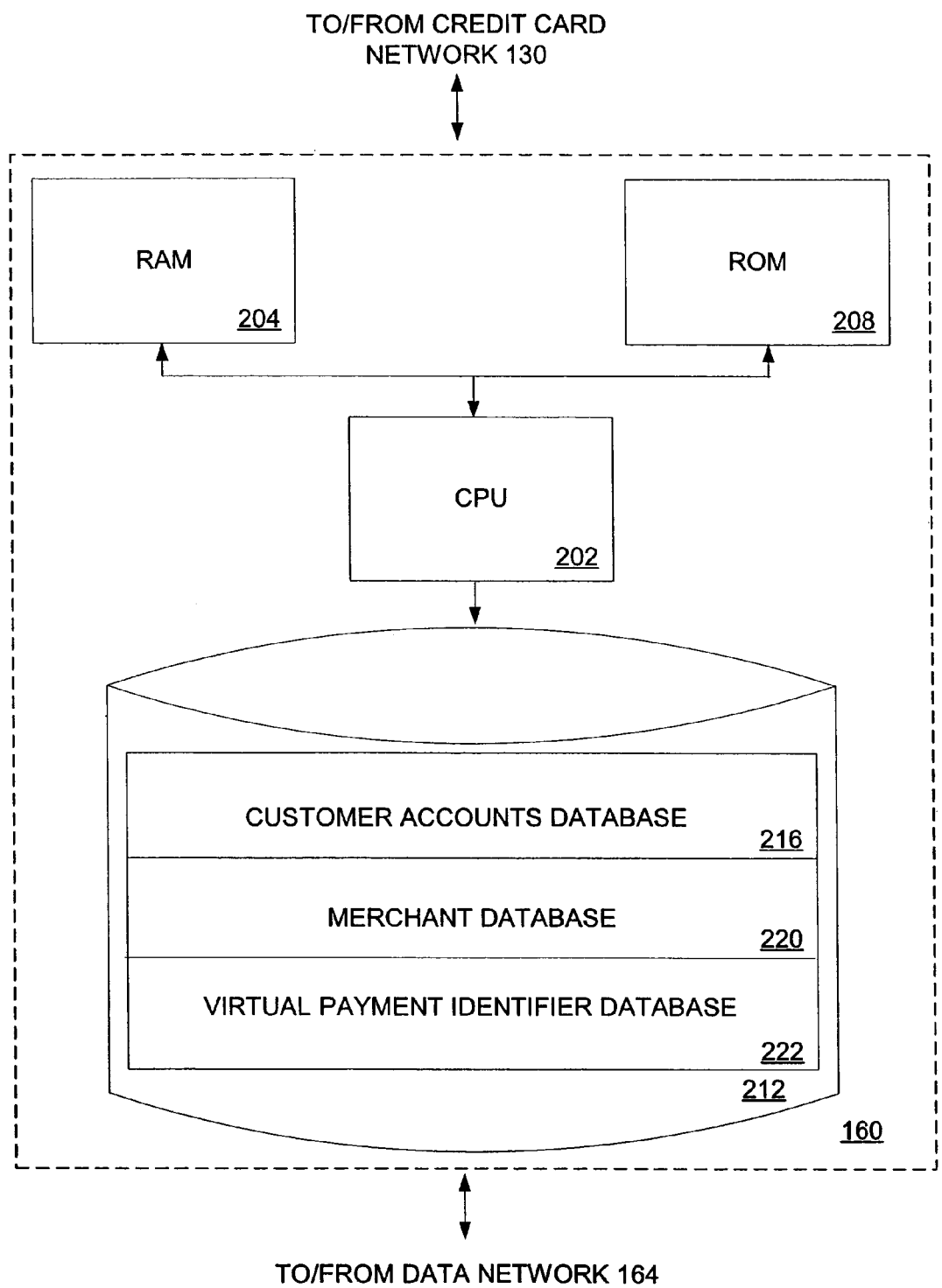
FIG. 2 provides a block diagrammatic representation of a prepaid transaction processor within the system of FIG. 1.

Referring now to FIG. 2, a block diagrammatic representation is provided of the prepaid transaction processor 160. As shown, the prepaid transaction processor 160 includes a CPU 202 connected to RAM 204, ROM 208, and a data storage device 212. The prepaid transaction processor 160 further includes one or more network communication modules (not shown) for effecting communication with the card association network 130 and the data network 164. Included within secondary data storage 212 are a customer accounts database 216, a merchant database 220, and a virtual payment identifier database 222. Secondary data storage 212 also includes a copy of the operating system (not shown) executed by the CPU 202 during operation of the transaction processor 160.

The customer accounts database 216 serves to map an account number on the membership card 114 to a record identifying the prepaid services used by the customer associated with the card 114. For example, a record within the database 216 could establish that the customer associated with membership account number "WWWW XXXX YYYY ZZZZ" is an existing customer of Cingular Wireless for prepaid wireless services.

The merchant database 220 is configured to map merchant account numbers to records identifying the prepaid services which each merchant is authorized to sell. For example, a record within the database 220 could indicate that the merchant identified by the account number "AAAA BBBB CCCC DDDD" is authorized to sell prepaid wireless services provided by Cingular Wireless.

FIG. 3 illustratively represents the organization of the virtual payment identifier database 222. In the exemplary embodiment the virtual payment identifier database 222 functions to establish a correspondence between the "virtual" payment amounts entered into the POS terminal 110 and the type and denomination of the prepaid service purchased. As shown in FIG. 3, the database 222 includes a listing of an exemplary set of virtual payment amounts 310 and the prepaid service category 320, service provider 330, prepaid product 340, and product denomination or purchase amount 312 associated with each. For example, in the embodiment of FIG. 3 the virtual payment amount 310 of "990.82" is used to encode a purchase amount 312 of $100 of prepaid wireless services furnished by T-Mobile.

In operation, the transaction processor 160 extracts the virtual payment amount from the embedded transaction information provided by the issuing bank processor 140 for a particular account replenishment transaction. The transaction processor 160 then uses this virtual payment amount as an index into database 222 in order to determine which of the service providers 170 should be contacted and the amount which should be requested to be added to the applicable customer account. Once the service provider 170 associated with the virtual payment amount has been identified, information identifying the specific customer account to be replenished may be retrieved from the customer accounts database 216 using the membership account number included within the embedded transaction information as an index. For example, if a virtual payment amount of "990.65" is included within the embedded transaction information, then the wireless phone number pertinent to prepaid wireless services from AT&T Wireless that corresponds to the extracted membership account number is retrieved from the customer accounts database 216. As mentioned above, information identifying more than a single customer account may be associated in the database 216 with a given membership account number.

Figure 4A:
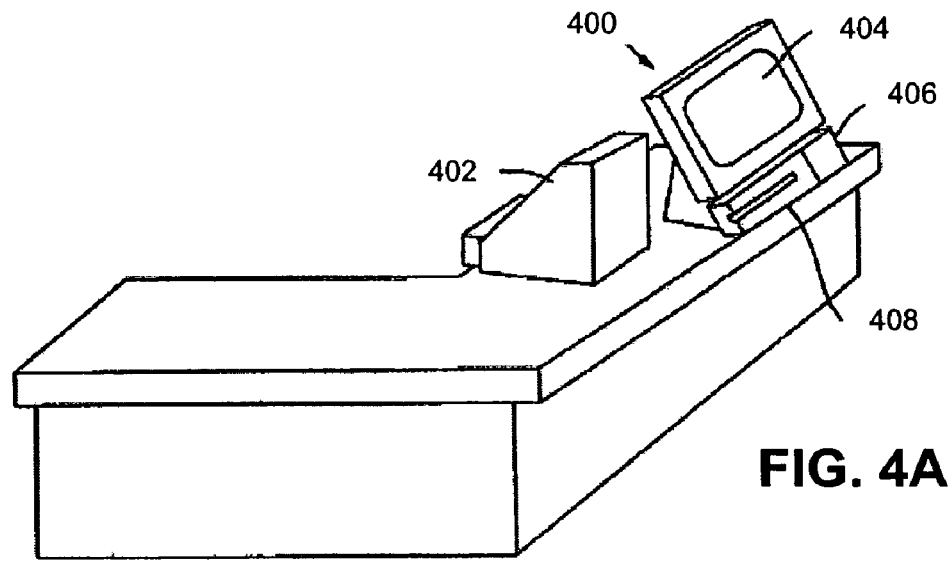
FIGS. 4A–4B illustratively represent alternative physical embodiments of a point-of-sale (POS) terminal incorporated within the system of FIG. 1.
Figure 4B:
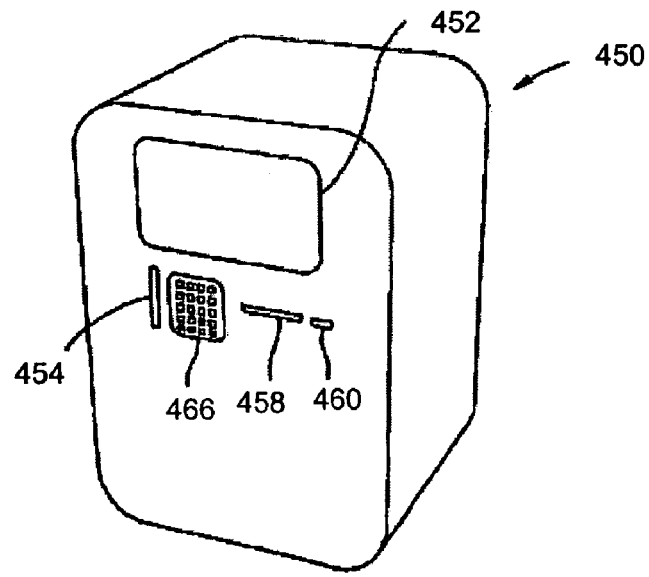

FIGS. 4A–4B illustratively represent alternative physical embodiments of the POS terminal 110. Specifically, FIG. 4A depicts a physical embodiment of a POS terminal 400 which is used in a typical checkout counter of a store, such as a convenience store. As shown, POS terminal 400 includes a touch-screen 404. Various options appear on touch-screen 404, which a customer may activate by touching an appropriate location on touch-screen 404. A customer makes payment for replenishment of the applicable prepaid account by paying cash to a store clerk operating cash register 402. Alternatively, a customer can pay with a credit card by swiping a credit card through credit card slot 408. Buttons 206 can be used by the customer in addition to touch-screen 204 to make additional selections, such as choosing a particular type of credit card.

It should be understood that any "standard" credit card transaction generated by the POS terminal 400 in connection with replenishment of the value of the applicable prepaid account will be distinct from the account replenishment transaction generated by the POS terminal 400 in accordance with the invention. In the example of FIG. 4A, the membership card 114 of the purchasing customer may also be swiped through credit card slot 408 in connection with generation of an account replenishment transaction message. In addition, a numeric keypad (not shown) rendered by touch-screen 404 may be used to enter the virtual payment amount corresponding to the requested provider and monetary denomination. Based upon these inputs, the POS terminal 400 generates an account replenishment transaction in the manner described above.

FIG. 4B depicts an alternative physical embodiment of a POS terminal 450 in the form of an automated kiosk. As shown, POS terminal includes a touch-screen 452. Credit card receptor 454 allows a consumer to submit payment for replenishment of the applicable prepaid services account by inserting a credit card, and also may be used in connection with reading of the customer's membership card 114. Alternatively, the customer can insert bills into bill receptor 458, or coins into coin receptor 460. Virtual payment amounts may be entered via keypad 466 or through a keypad (not shown) rendered by touch-screen 452.

Figure 5A:
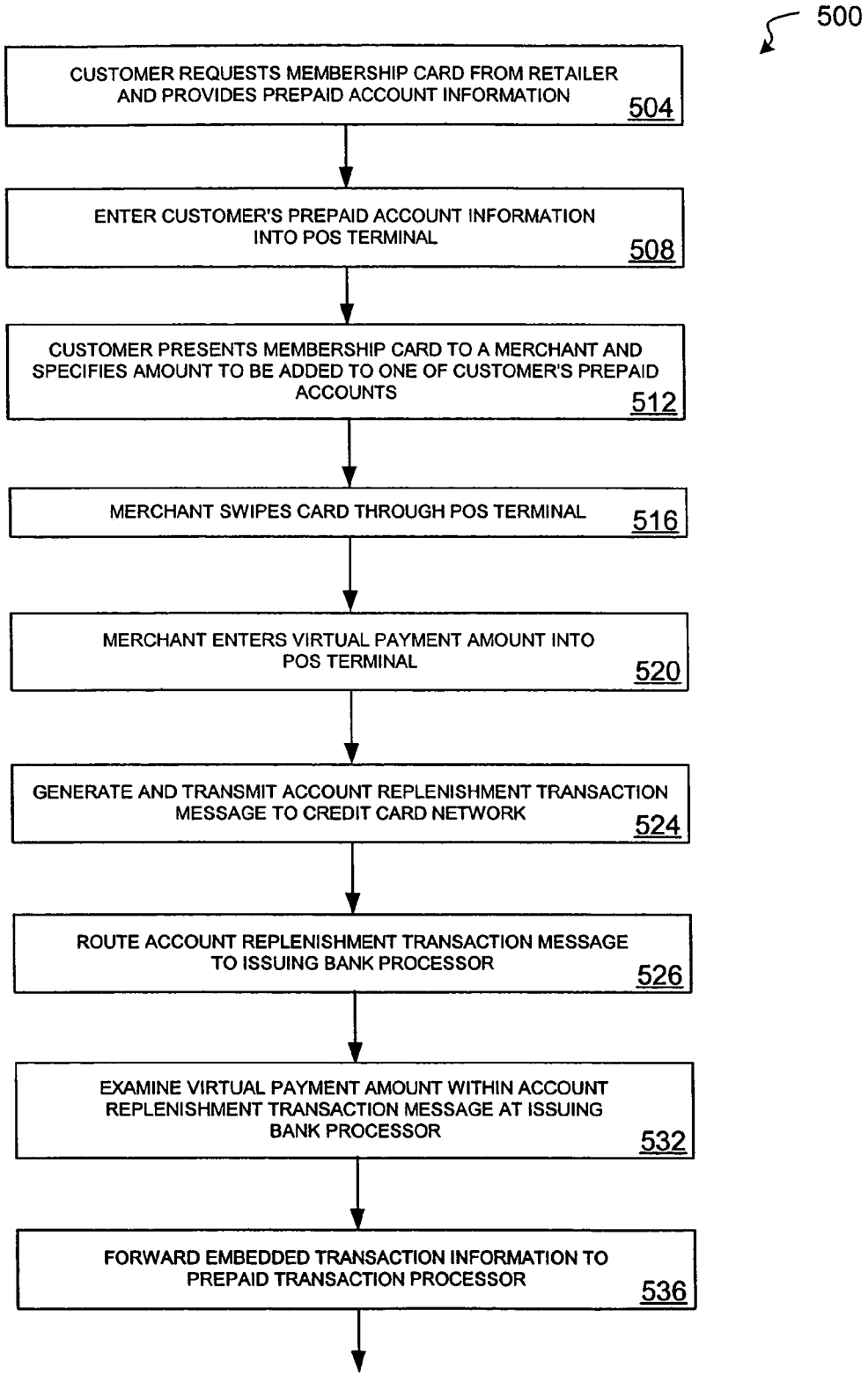
FIG. 5 is a flowchart comprised of a sequence of events and operations consistent with the account replenishment method of the present invention.
Figure 5B:
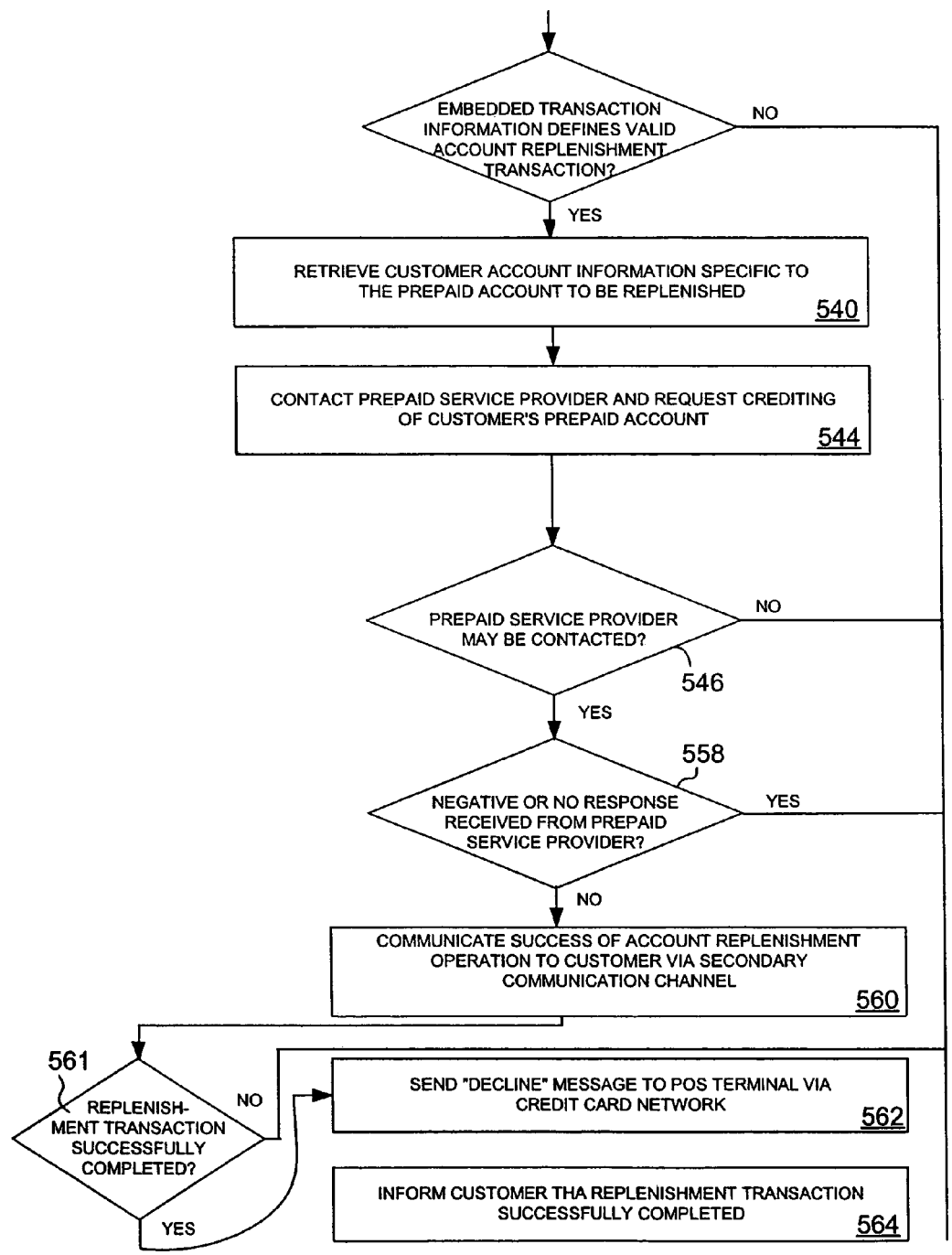
Figure 5C:
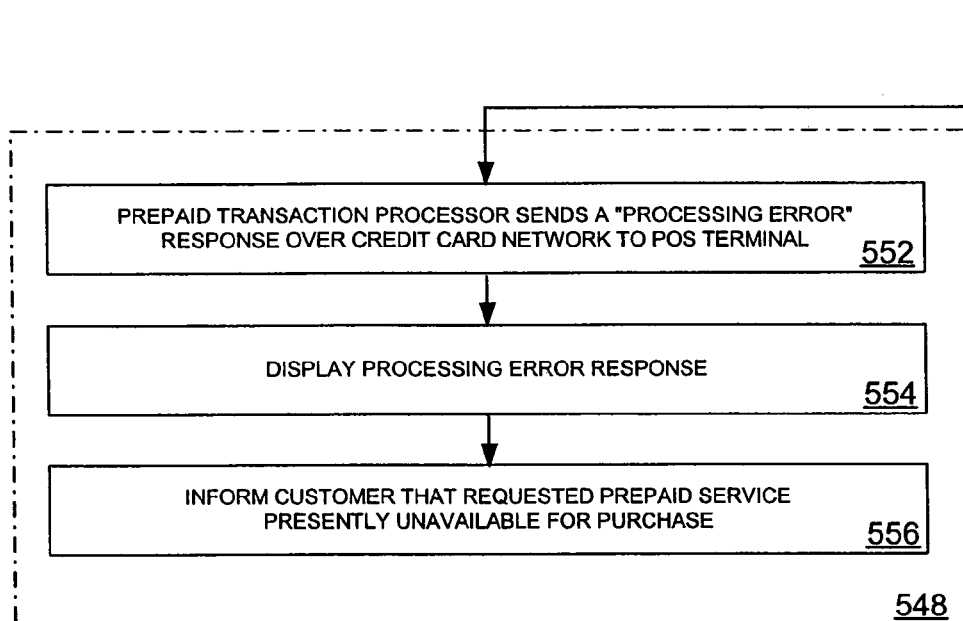

Turning now to FIG. 5, a flowchart 500 comprised of a sequence of events and operations consistent with the account replenishment method of the present invention will now be described. In the exemplary embodiment the inventive method is initiated upon a customer visiting an authorized merchant or retailer in order to request a membership card. To this end the customer informs the dealer of the identity of one or more of the customer's prepaid services providers (e.g., a prepaid wireless carrier) and information uniquely identifying the customer's account with each such provider (e.g., wireless phone number) (step 504). The merchant then "swipes" the membership card to be issued to the customer through a POS terminal, which reads a membership account number associated with the card. The merchant also enters the customer's wireless phone number or other account-identifying information supplied by the customer into the POS terminal (step 508).

When a customer desires to add value to one or more prepaid accounts associated with the membership card, the customer presents the card to a merchant and specifies a particular prepaid service and the amount to be added to such customer's account (step 512). The merchant swipes the membership card through a POS terminal, which reads the customer's membership account number from the membership card (step 516). The merchant also enters the virtual payment amount into the POS terminal corresponding to the specified prepaid account and the value to be added to such account (step 520). An account replenishment transaction message containing embedded transaction information (i.e., membership account number, virtual payment amount, merchant account number) is then created by the POS terminal and transmitted to a card association network via an acquiring bank processor (step 524). Within the card association network, the account replenishment transaction message is routed in accordance with a bank identification number (BIN) read from the membership card. Specifically, the BIN is a number uniquely identifying the bank or financial institution issuing the membership card, and the account replenishment transaction message is routed to a processor of this issuing bank (step 526).

Within the issuing bank processor, the virtual payment amount within the account replenishment transaction message is examined in order to determined whether or not a standard credit card authorization transaction has been received (step 532). Once the issuing bank processor has examined the virtual payment amount and determined that a standard credit card authorization transaction has not been received, it forwards the embedded transaction information within the received account replenishment transaction message via a data network to the prepaid transaction processor (step 536). It is observed that in certain embodiments the prepaid transaction processor and the issuing bank processor may comprise a single entity, thus obviating the need for separate transmittal of the embedded transaction information via a data network. The prepaid transaction processor verifies that the membership account number, virtual payment amount, and merchant account number correspond to a valid account replenishment transaction (step 537). For example, it could be determined that the virtual payment amount corresponds to $20 of prepaid wireless services from Cingular Wireless, that the customer has an account with Cingular Wireless, and that the merchant is authorized to sell prepaid wireless products offered by Cingular Wireless. If this verification fails, then a failure procedure 548 (described below) is executed.

In alternate implementations the account replenishment transaction message is routed directly from the card association network to the prepaid transaction processor in accordance with the BIN read from the membership card; that is, the BIN is associated with the prepaid transaction processor itself rather than with a processor of an issuing bank. Once received at the prepaid transaction processor, the account replenishment transaction message and the embedded transaction information therein is processed in the manner described above and hereinafter.

Once the embedded transaction information has been successfully verified for accuracy, the prepaid transaction processor retrieves customer account information specific to the customer's prepaid account to be replenished from the customer accounts database (step 540). The prepaid transaction processor then automatically contacts a server operated by the appropriate service provider and requests it to credit the customer's prepaid account by an amount based upon or equivalent to the value of the payment originally made by the customer to the merchant initiating the account replenishment transaction (step 544).

If for some reason the service provider cannot be contacted (step 546), then a failure procedure 548 is carried out. Specifically, the prepaid transaction processor sends a predefined response (e.g., a "processing error" response) over the card association network (step 552). This predefined response is then displayed on the POS terminal initiating the account replenishment transaction (step 554). At this point the merchant operating the POS terminal typically informs the customer that a prepaid service may not be purchased at the present time (step 556).

After submitting the prepaid account replenishment request to the service provider pursuant to step 544, the prepaid transaction processor awaits a response as to the outcome of the request. If no response is received from the service provider or if a negative response is received, then the failure procedure 548 is executed (step 558). If the request is accepted by the service provider, the success of the request may be communicated to the customer via a secondary communication channel (i.e., other than via the card association network) (step (step560). In addition, in the event the replenishment transaction is successfully completed 561), the transaction processor sends the appropriate predefined response over the card association network for display on the screen of the POS terminal initiating the account replenishment transaction (step 562). In this case the merchant will then typically inform the customer that the replenishment transaction has been successfully completed (step 564). If for some reason the account replenishment transaction is not completed (step 561), then the failure procedure 548 is executed.

As mentioned above, financial settlement between the merchant accepting payment for the prepaid services being purchased and the applicable prepaid services provider may be carried out using conventional means (e.g., using standard batch processing techniques). For example, when settlement is to be accomplished without relying upon a specialized fulfillment transaction processed by the card association network, the merchant may aggregate (e.g. at the end of a given processing period) into a file various information concerning all account replenishment operations initiated by such merchant during the relevant period. The resulting batch file is communicated to an automated clearing house (ACH) gateway. In turn, the ACH gateway transmits the information within the batch file to the Federal Reserve, which effectively transfers funds from the merchant's bank account to the service provider's bank account. It may be appreciated that this transfer of finds is all that is required to achieve settlement of account replenishment transactions among a given merchant and service provider.

That is, it is unnecessary to transfer funds to or from any intermediary account associated with a customer in order to effect such settlement. Moreover, it is similarly unnecessary to void or "reverse" one or more credit card transactions to achieve such settlement, since in the exemplary embodiment a "decline" response is transmitted through the card association network in order to signal successful completion of an account replenishment operation. That is, it appears to the card association network and issuing bank as if a proposed credit transaction has been simply declined, and consequently funds transfers which would subsequently need to be reversed do not occur.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A method for crediting a customer account maintained by a vendor of services in response to payment received from a customer, the method comprising:
    issuing, to the customer, a membership account number associated with at least the customer account;
    receiving, from the customer at a point-of-sale, the membership account number and a payment corresponding to a requested amount of a service offered by the vendor;
    generating, at the point-of-sale, an authorization message including at least the membership account number and embedded transaction information containing a virtual payment amount identifying both the service offered by the vendor and the requested amount;
    communicating the embedded transaction information from the point-of-sale to a database server;
    crediting, in response to the embedded transaction information, the customer account based upon an amount encoded by the virtual payment amount; and
    electronically transferring funds based upon the_amount encoded by the virtual payment amount from a first account associated with the point-of-sale directly to a second account associated with the vendor.

2. The method of claim 1 further including verifying, at the database server, that the embedded transaction information defines a valid transaction and transmitting a response from the database server to the point-of-sale.

3. The method of claim 2 wherein the response indicates transaction failure if the embedded transaction information is determined to not define a valid transaction.

4. The method of claim 2 wherein the response indicates successful transaction completion if the embedded transaction information is determined to define a valid transaction and confirmation is received at the database server that the customer account has been credited.

5. The method of claim 2 further including maintaining, within a database of the database server, an association between the membership account number and a customer record identifying prepaid services used by the customer.

6. The method of claim 5 further including verifying that the requested amount of the service corresponds to one of the prepaid services identified within the customer record.

7. The method of claim 2 wherein the response indicates a predefined status if the embedded transaction information is determined to define a valid transaction and confirmation is received at the database server that the customer account has been credited, such predefined status not being selected from the group including: approved, declined or processing error.

8. The method of claim 1 further including maintaining, within a database of the database server, an association between a merchant account number applicable to the point-of-sale and a list of approved prepaid services authorized to be purchased at the point-of-sale.

9. The method of claim 8 wherein the merchant account number is included within the transaction information.

10. The method of claim 9 further including verifying that the requested amount of the service corresponds to a prepaid service included within the list of approved prepaid services.

11. The method of claim 1 further including issuing a membership card to the customer, the membership card storing the membership account number.

12. The method of claim 11 wherein the membership account number is received at the point-of-sale by swiping the membership card through a terminal and wherein a virtual payment amount included within the embedded transaction information is entered into the terminal.

13. The method claim 1 further including transmitting, in response to the embedded transaction information, an account credit request from the database server to a vendor server operated by the vendor.

14. The method of claim 13 further including communicating, from the database server to the point-of-sale, a processing error response if the database server fails to receive a response from the vendor server within a predetermined time period following transmittal of the account credit request to the vendor server.

15. The method of claim 13 further including communicating, from the database server to the customer via an out-of-band communication channel, a transaction-success notification if the database server receives a transaction-completed response from the vendor server following transmittal of the account credit request to the vendor server.

16. The method of claim 1 wherein the membership account number is stored upon a membership card issued to the customer by an issuing entity, the method further including receiving the authorization message at an issuing processor of the issuing entity.

17. The method of claim 16 further including transmitting the embedded transaction information contained within the authorization message from the issuing processor to the database server.

18. The method of claim 17 wherein, in response to the embedded transaction information, the database server retrieves account identifying information from a database of the database server that is specific to the customer account.

19. The method of claim 18 wherein the database server transmits, to a vendor server, a request to credit the customer account based upon the amount of the payment.

20. The method of claim 1 further including maintaining, within a database of the database server, an association between virtual payment amounts and monetary amounts of prepaid services offered by a plurality of vendors wherein the embedded transaction information includes one of the virtual payment amounts.

21. The method of claim 1 further including:
receiving the authorization message at an issuing processor of an entity issuing the membership account number;
determining, at the issuing processor, whether the embedded transaction information corresponds to a valid credit or debit transaction; and
forwarding the embedded transaction information to the database server in the event that the embedded transaction information is determined to not correspond to a valid debit or credit transaction.

22. The method of claim 1 wherein the customer account is a prepaid long-distance telephone service account.

23. The method of claim 1 wherein the customer account is a prepaid wireless telephone service account.

24. The method of claim 1 wherein the communicating embedded transaction information within the authorization message from the point-of-sale to the database server includes transmitting the authorization message over a card association network.

25. The method of claim 1 wherein the communicating the authorization message includes:
transmitting the authorization message from the point-of-sale to an acquiring processor associated with the point-of-sale;
forwarding the authorization message from the acquiring processor into a card association network;
receiving the authorization message at an issuing processor of an entity responsible for issuing the membership account number; and
routing the embedded transaction information from the issuing processor to the database server.

26. The method of claim 1 wherein the electronically transferring funds is effected using an automated clearinghouse system.

27. The method of claim 1 further including maintaining, within the database server, a database associating the membership account number with identifying information pertaining to the customer account.

28. The method of claim 1 wherein the electronically transferring funds is effected using a card association network.

29. A method for crediting a customer account maintained by a vendor of prepaid services in response to payment received from a customer, the method comprising:
issuing to the customer a membership card containing a membership account number;
receiving, from the customer at a point-of-sale, the membership account number and a payment corresponding to a requested amount of a prepaid service offered by the vendor;
maintaining, within a database server, a database associating the membership account number with identifying information pertaining to the customer account;
maintaining, within the database, an association between a merchant account number applicable to the point-of-sale and a list of approved prepaid services authorized to be purchased at the point-of-sale;
generating, at the point-of-sale, an authorization message including at least the membership account number and embedded transaction information containing a virtual payment amount identifying both the prepaid service offered by the vendor and the requested amount;
maintaining, within the database, an association between virtual payment amounts and monetary amounts of prepaid services offered by a plurality of vendors, the embedded transaction information including a first of the virtual payment amounts;
communicating the embedded transaction information from the point-of-sale to the database server;
crediting, subsequent to receipt of the embedded transaction information at the database server, the customer account based upon an amount encoded by the virtual payment amount; and
electronically transferring funds based upon the amount encoded by the virtual payment amount from a first account associated with the point-of-sale directly to a second account associated with the vendor.

30. The method of claim 29 wherein the membership account number is received at the point-of-sale by swiping the membership card through a terminal and wherein the first of the virtual payment amounts is entered into the terminal.

31. The method of claim 29 further including verifying, at the database server, that the embedded transaction information defines a valid transaction and transmitting a response from the database server to the point-of-sale.

32. The method of claim 29 wherein the membership account number is associated with a plurality of additional customer accounts maintained by a plurality of additional vendors.

33. The method of claim 29 wherein said electronically transferring funds is performed without transferring funds to an intermediary account prior to transfer of said funds to said second account.

34. A method for crediting a customer account maintained by a vendor of services in response to payment received from a customer at a point-of-sale, the method comprising:
receiving, at a database server, embedded transaction information extracted from an authorization message generated at the point-of-sale, wherein the authorization message includes at least a membership account number associated with the customer account and embedded transaction information, wherein the embedded transaction information contains a virtual payment amount encoding an offered service and a requested amount corresponding to the payment;
crediting, in response to the embedded transaction information, the customer account based upon an amount encoded by the virtual payment amount; and
electronically transferring funds based upon the amount encoded by the virtual payment amount from a first account associated with the point-of-sale directly to a second account associated with the vendor.

35. The method of claim 34 further including verifying, at the database server, that the embedded transaction information defines a valid transaction and transmitting a response from the database server to the point-of-sale.

36. The method of claim 35 wherein the response indicates transaction failure if the embedded transaction information is determined to not define a valid transaction.

37. The method of claim 35 wherein the response indicates successful transaction completion if the embedded transaction information is determined to define a valid transaction and confirmation is received at the database server that the customer account has been credited.

38. The method of claim 35 further including maintaining, within a database of the database server, an association between the membership account number and a customer record identifying prepaid services used by the customer.

39. The method of claim 38 further including verifying that the requested amount of the service corresponds to one of the prepaid services identified within the customer record.

40. The method of claim 34 further including maintaining, within a database of the database server, an association between a merchant account number applicable to the point-of-sale and a list of approved prepaid services authorized to be purchased at the point-of-sale.

41. A method for providing authorization to credit a customer account maintained by a vendor of services in response to payment received from a customer, the method comprising:
- receiving, from the customer at a point-of-sale, a membership account number and a payment corresponding to a requested amount of a service offered by the vendor wherein the membership account number is associated with at least the customer account;
- generating, at the point-of-sale, an authorization message including at least the membership account number and embedded transaction information containing a virtual payment amount identifying both the service offered by the vendor and the requested amount; and
- transmitting the embedded transaction information from the point-of-sale to a database server;
- wherein the embedded transaction information is used to facilitate crediting of the customer account based upon an amount encoded by the virtual payment amount.

42. The method of claim 41 further including receiving, at the point-of-sale, a response indicating that the embedded transaction information defines a valid transaction.

43. The method of claim 42 wherein the response indicates transaction failure if the embedded transaction information is determined to not define a valid transaction.

44. The method of claim 42 wherein the response indicates successful transaction completion if the embedded transaction information is determined to define a valid transaction and confirmation is received at the database server that the customer account has been credited.

45. The method of claim 41 further including issuing a membership card to the customer, the membership card storing the membership account number.

46. The method of claim 45 wherein the membership account number is received at the point-of-sale by swiping the membership card through a terminal and wherein a virtual payment amount included within the embedded transaction information is entered into the terminal.

47. A method for crediting a customer account maintained by a vendor of services in response to payment received from a customer, the method comprising:
- receiving, from the customer at a point-of-sale, a membership account number and a payment corresponding to a requested amount of a service offered by the vendor;
- generating, at the point-of-sale, an authorization message including at least the membership account number and a virtual payment amount;
- distinguishing the virtual payment amount from a set of standard payment amounts;
- crediting the customer account based upon an amount encoded by the virtual payment amount; and
- electronically transferring funds based upon the amount encoded by the virtual payment amount from a first account associated with the point-of-sale to a second account associated with the vendor.

48. The method of claim 47 further including verifying that the authorization message includes information defining a valid transaction and transmitting a response to the point-of-sale.

49. The method of claim 48 wherein the response indicates transaction failure if the information is determined to not define a valid transaction.

50. The method of claim 48 wherein the response indicates successful transaction completion if the information is determined to define a valid transaction and confirmation is received that the customer account has been credited.

51. A method for crediting a first customer account maintained by a first vendor of services in response to payment received from a customer, the method comprising:
- issuing, to the customer, a membership account number associated with both the first customer account and a second customer account;
- receiving, from the customer at a point-of-sale, the membership account number and a first payment corresponding to a first requested amount of a first service offered by the first vendor;
- generating, at the point-of-sale, a first authorization message including at least the membership account number and first embedded transaction information containing a first virtual payment amount identifying both the first service offered by the first vendor and the first requested amount;
- communicating the first embedded transaction information from the point-of-sale to a database server;
- crediting, in response to the first embedded transaction information, the first customer account based upon an amount encoded by the first virtual payment amount; and
- electronically transferring funds based upon the amount encoded by the first virtual payment amount from a first account associated with the point-of-sale directly to a second account associated with the first vendor.

52. The method of claim 51, further comprising:
- generating a second authorization message including at least second embedded transaction information;
- communicating the second embedded transaction information to the database server, wherein the second embedded transaction information contains a second virtual payment amount identifying both a second service offered by a second vendor and a second requested amount; and
- crediting, in response to the second embedded transaction information, the second customer account based upon an amount encoded by the second virtual payment amount, wherein the second customer account is maintained by the second vendor.

53. The method of claim 52, further comprising:
- electronically transferring funds based upon the amount encoded by the second virtual payment amount directly to a third account associated with the second vendor.

54. The method of claim 51, further comprising:
- generating a second authorization message including at least second embedded transaction information;
- communicating the second embedded transaction information to the database server, wherein the second embedded transaction information contains a second virtual payment amount identifying both a second service offered by the first vendor and a second requested amount; and
- crediting, in response to the second embedded transaction information, the second customer account based upon an amount encoded by the second virtual payment amount, wherein the second customer account is maintained by the first vendor.

55. The method of claim 54, further comprising:
- electronically transferring funds based upon the amount encoded by the second virtual payment amount directly to the second account associated with the first vendor.

* * * * *